(12) United States Patent
Bai et al.

(10) Patent No.: US 10,793,974 B2
(45) Date of Patent: Oct. 6, 2020

(54) METHOD FOR PREPARING GRAPHENE-POLYAMIDE NANOCOMPOSITE FIBER

(71) Applicant: NANTONG QIANGSHENG GRAPHENE TECHNOLOGY CO., LTD., Nantong, Jiangsu (CN)

(72) Inventors: Yongxiao Bai, Shanghai (CN); Xiaolin Sha, Shanghai (CN); Yan Sha, Shanghai (CN)

(73) Assignee: NANTONG QIANGSHENG GRAPHENE TECHNOLOGY CO., LTD., Nantong, Jiangsu (CN)

( * ) Notice: Subject to any disclaimer, the term of this patent is extended or adjusted under 35 U.S.C. 154(b) by 319 days.

(21) Appl. No.: 15/763,442

(22) PCT Filed: Oct. 9, 2016

(86) PCT No.: PCT/CN2016/101533
§ 371 (c)(1),
(2) Date: Apr. 2, 2018

(87) PCT Pub. No.: WO2017/211022
PCT Pub. Date: Dec. 14, 2017

(65) Prior Publication Data
US 2019/0048491 A1    Feb. 14, 2019

(30) Foreign Application Priority Data
Jun. 8, 2016   (CN) .......................... 2016 1 0405168

(51) Int. Cl.
*D01F 6/60* (2006.01)
*D01F 1/10* (2006.01)
(Continued)

(52) U.S. Cl.
CPC ................ *D01F 6/60* (2013.01); *C08J 3/203* (2013.01); *C08J 3/226* (2013.01); *C08K 3/04* (2013.01);
(Continued)

(58) Field of Classification Search
None
See application file for complete search history.

(56) References Cited

U.S. PATENT DOCUMENTS

| | | | |
|---|---|---|---|
| 6,573,314 B1 * | 6/2003 | Knudsen | ................... B29B 9/12 523/223 |
| 2009/0123731 A1 * | 5/2009 | Shimizu | ................... C08J 3/005 428/323 |

(Continued)

*Primary Examiner* — Monica A Huson
*Assistant Examiner* — Kelsey C Grace

(57) ABSTRACT

The present invention discloses a method for preparing graphene-polyamide nanocomposite fiber. The method includes the following steps of: mixing polyamide chips with graphene or modified graphene, and then extruding and palletizing to obtain graphene-polyamide masterbatch; melt-spinning the graphene-polyamide masterbatch after drying the same, to prepare the graphene-polyamide nanocomposite fiber. Compared with the existing industrial polyamide composite fiber, the method of the present invention has the advantages of simple process and low cost, and can effectively improve the production efficiency and capacity; the modified graphene has such an excellent compatibility with the matrix that it can be uniformly dispersed in the matrix, so that the graphene reinforced phase is perfectly compounded with the polyamide matrix material, thereby greatly improving the performance of graphene-polyamide nanocomposite fiber.

8 Claims, 1 Drawing Sheet

(51) Int. Cl.
*C08K 3/04* (2006.01)
*C08L 79/06* (2006.01)
*C08J 3/20* (2006.01)
*C08J 3/22* (2006.01)
*D01D 1/04* (2006.01)
*D01D 5/08* (2006.01)
*D01F 6/90* (2006.01)
*D01D 5/12* (2006.01)

(52) U.S. Cl.
CPC ............ *C08K 3/042* (2017.05); *C08L 79/06* (2013.01); *D01D 1/04* (2013.01); *D01F 1/10* (2013.01); *D01D 5/08* (2013.01); *D01D 5/12* (2013.01); *D01F 6/90* (2013.01); *D10B 2331/02* (2013.01); *D10B 2401/16* (2013.01)

(56) References Cited

U.S. PATENT DOCUMENTS

2011/0245378 A1* 10/2011 Russ ................. C08K 3/04
523/440
2016/0032061 A1* 2/2016 Clauss ................. C08J 3/2053
523/351

* cited by examiner

METHOD FOR PREPARING GRAPHENE-POLYAMIDE NANOCOMPOSITE FIBER

CROSS REFERENCE OF RELATED APPLICATION

This is a U.S. National Stage under 35 U.S.C 371 of the International Application PCT/CN2016/101533, filed Oct. 9, 2016, which claims priority under 35 U.S.C. 119(a-d) to CN 201610405168.X, filed Jun. 8, 2016.

BACKGROUND OF THE PRESENT INVENTION

Field of Invention

The present invention relates to the field of fiber materials and relates to a method for preparing graphene-polyamide (graphene-PA) nanocomposite fiber.

Description of Related Arts

Graphene is a two-dimensional nanomaterial. (1) Its surface density is 0.77 mg/m$^2$, which means that a regular hexagonal carbon ring in the graphene is taken as the structural unit. Since only ⅓ of each carbon atom belongs to this hexagonal structure, the amount of the carbon atoms in one structural unit is two. The area of the hexagon is 0.052 nm$^2$. From this, it can be calculated that the surface density of the graphene is 0.77 mg/m$^2$. (2) Conductivity: The conductivity of a two-dimensional material can be calculated from the formula of σ=e·n·μ. When the carrier density n=1012 cm$^{-2}$, the mobility μ is 2×105 cm$^2$V$^{-1}$s$^{-1}$. The calculated surface resistance of graphene is about 31 Ω/sq, which shows that the resistance of a graphene hammock with an area of 1 m$^2$ is only 31Ω. (3) Strength: The ultimate strength (tensile strength) of graphene is 42 N/m. If the common steel has the same thickness as graphene (about 0.335 nm), the two-dimensional strength limit thereof is 0.084-0.40 N/m can be deduced. It indicates that the ideal strength of graphene is about 100 times that of the ordinary steel. Graphene sheets with an area of 1 m$^2$ can withstand a mass of 4 kg. (4) Thermal conductivity: The experimental value of the thermal conductivity of graphene is about 5000 Wm$^1$K$^{-1}$, which is more than 10 times the thermal conductivity of copper (401 Wm$^{-1}$K$^{-1}$) at room temperature. Therefore, all these unique properties make graphene a prominent candidate of reinforcing material for the application in polymer nanocomposites. Its reinforcing effect is not only better than clay, montmorillonite and other reinforcing materials, but also can reach a lever which clay or montmorillonite cannot.

However, the surface energy of graphene is very high due to its own structure, leading it is easy to deformation, such as rolling up, stacking up, agglomeration and other problems. If graphene has poor compatibility with the polymer matrix, the graphene will be unevenly dispersed, causing the graphene sheet to roll up or form agglomeration; so that the composite will form stress concentration points in the application, which greatly weakens the performance of nanocomposite fiber. In addition, if graphene is poorly compatible with the polymer matrix, it will result in the insufficiently bonding between graphene and matrix material and cannot be able to play a good role in the transmission and dispersion load, or occurs a slippage during the practical application, which leads to the decrease and failure of the mechanical properties of the composites.

SUMMARY OF THE PRESENT INVENTION

An object of the present invention is to overcome the above-mentioned poor compatibility between graphene and polymer matrix, providing a method for preparing graphene-polyamide nanocomposite fiber. Based on the industrial production of the existing polyamide filament, this invention provides a method to prepare the high-performance graphene-polyamide nanocomposite fiber. Compared with the existing industrial methods, the method has lots of advantages, such as simple process, low cost, and can effectively increase the production efficiency and capacity. Since the modified graphene has an excellent compatibility with the matrix, it can be well dispersed in the matrix, so that the modified graphene can uniformly compound with polymer matrix, thereby greatly improving the properties of the graphene-polyamide nanocomposite fiber.

The object of the present invention is realized by means of the following technical solution:

In the first aspect, the present invention relates to a method for preparing graphene-polyamide nanocomposite fiber, wherein the method comprises steps of:

(S1) mixing polyamide chips with graphene or modified graphene, and then extruding and palletizing, and obtaining graphene-polyamide masterbatch; and (S2) melt-spinning after drying the graphene-polyamide masterbatch, and finally obtaining the graphene-polyamide nanocomposite fiber.

The "graphene" is a general term for all graphenes without being experienced modification process, and comprises, for example, graphene oxide, ball-milling mechanically exfoliated graphene, three-roll milling mechanically exfoliated graphene, CVD growth graphene, graphene prepared by $CO_2$-supercritical expansion and exfoliation, and also comprises the graphene without any treatment.

Preferably, the polyamide comprises polyamide 6 (PA6) and polyamide 66 (PA66).

Preferably, the graphene is graphene oxide or graphene (herein, graphene means the graphene without any treatment); the modified graphene is one or more members selected from a group consisting of a graphene oxide modified by coupling agent, a graphene oxide modified by cation surfactant, a graphene modified by alkyl bromide, a graphene modified by amino compound and a graphene oxide modified by polyvinyl alcohol.

Preferably, the graphene modified by alkyl bromide is one or more members selected from a group consisting of a graphene oxide modified by bromododecane, a graphene oxide modified by bromohexadecane and a graphene oxide modified by bromooctadecane.

Preferably, the graphene modified by amino compound is one or more members selected from a group consisting of a graphene modified by caprolactam, a graphene oxide modified by amino-terminated polyethylene glycol, a graphene modified by poly diallyldimethylammonium chloride (PDDA), a graphene modified by polyetherimide (PEI), a graphene modified by polyether amine, a graphene modified by hexadecyl trimethyl ammonium bromide, a graphene modified by N,N-dimethylacetamide, a graphene oxide modified by polyethylene imine and a graphene modified by N-(2-Acetamido)iminodiacetic acid.

Preferably, a type of graphene in the modified graphene is one or more members selected from a group consisting of a reduced graphene oxide obtained by thermal expansion at elevated temperature, a reduced graphene oxide obtained by thermal expansion at low temperature, a graphene exfoliated electrochemically, a modified electrochemically-exfoliated graphene, a ball-milling mechanically exfoliated graphene, a three-roll milling mechanically exfoliated graphene, a CVD growth graphene, a graphene prepared by $CO_2$-supercritical expansion and exfoliation, a graphene oxide exfoliated by chemical oxidation, a graphene prepared by the Hummers, and a graphene prepared by the Modified Hummers.

Preferably, in the step (S1), a mass ratio of the polyamide chips to the graphene or the modified graphene is 1:0.01%-15%.

Preferably, in the step (S1), the polyamide chips and the graphene or the modified graphene are separately dried and then mixed; the polyamide chips are dried until a water content thereof is controlled to be below 60 ppm, and more preferably below 30 ppm.

Preferably, in the step (S1), the mixing is an intermittent mixing in a high-speed mixer; a rotational speed corresponding to the mixing is 5000-15000 rad/min and a mixing time is 1-30 minutes. Intermittent mixing is adopted to avoid the influence of temperature rise during mixing. In addition, high-speed mixing will cause the temperature to rise sharply; therefore, the rotational speed is controlled to be 5000-15000 rad/min to prevent the danger of explosion.

Preferably, in the step (S2), the graphene-polyamide masterbatch is dried and then melt-spun.

Preferably, the graphene-polyamide masterbatch is dried at a temperature range from 50 to 220° C. and drying time from 4 to 40 hours, and a water content of the dried graphene-polyamide masterbatch is below 100 ppm, and more preferably below 60 ppm.

The principle of the present invention is that graphene, as a kind of two-dimensional cellular crystal composed of carbon atoms, has unparalleled mechanical property and electrical, thermal conductivity and other functionalities. It is the thinnest material with the highest strength known so far. In the preparation of graphene-polyamide nanocomposite, a key issue is to solve the compatibility between the two. However, the surface energy of graphene is very high due to its own structure, leading to easy deformation such as rolling up, stacking up, agglomeration and other problems of the graphene sheets. This causes the graphene to disperse very unevenly in the PA matrix, which greatly affects the performance of graphene-PA nanocomposite. Therefore, only when the compatibility problem of graphene with PA matrix has been solved can the advantages of two-dimensional enhancement and low add-on of graphene be fully exhibited, and the structural property of composite fiber material will be uniform, so that the performance of graphene-PA nanocomposite can be improved thoroughly. If there is no solution to the compatibility between the two, it will directly lead to the inability of graphene to disperse well in the matrix, and the graphene sheets will roll up or form agglomeration, so that the composite may form a stress concentration point in practical application, which greatly weakens the performance of graphene-PA nanocomposite. In the prepared graphene nanocomposite, graphene plays a role of reinforced phase. Therefore, the graphene must be closely bonded with the matrix material to be able to transmit and disperse the load and prevent the graphene in composite with the PA matrix from sliding in the stress loading process, otherwise, which would lead the decrease and failure to the mechanical properties of the material. To some extent, the grapheme's dispersibility and its binding force with the polymer matrix in the preparation of graphene-PA nanocomposite fiber are correlated. That is, only when the uniform dispersion of graphene has been achieved can the graphene and PA matrix be firmly linked and tightly bonded in a reliable manner. The PA matrix contains an amino group. The present invention can greatly improve the dispersion of graphene in the PA matrix material through the surface modification of graphene (especially using the amino compound to functionalize graphene), so that the graphene and the PA matrix are tightly combined together, and a stable interaction may be produced between the molecules of the two, thus greatly improving the strength and other mechanical properties of the graphene-PA nanocomposite fiber.

Compared with the prior art, the present invention has the following beneficial effects:

(1) The present invention enables the graphene and the PA matrix to be tightly combined together through the surface modification of graphene to generate stable interaction between the molecules of the two, thereby greatly improving the performance of the graphene-PA nanocomposite;

(2) Compared with the common industrial polyamide fiber yarn currently available, the breaking strength of the graphene-PA nanocomposite prepared by the present invention is increased by more than 50%; and moreover, the high electrical, thermal conductivities and barrier property of the graphene also give the graphene-polyamide nanocomposite fiber with antistatic, heat-resisting, flame-retardant, antibacterial properties and other functional characteristics;

(3) Preparation of graphene-PA composite masterbatch chips by melting method of the present invention is performed in a twin-screw extruder so that the preparation of the composite masterbatch chips is very simple and practicable and does not require additional equipment, saving and reducing production costs, which is suitable for continuous industrial production and improves the efficiency and capacity. In addition, melt-blending method does not require the use of a solvent and does not generate waste that is harmful to the environment during the preparation, thus it is an environment-friendly production method;

(4) In the present invention, the FDY composite fiber is prepared through one-step drawing by a melt-spinning machine. The process converts the process route of conventional two-step method for manufacturing fully drawn yarns into the process route of a one-step method for producing FDY fully drawn yarns, which not only greatly shortens the production flow and reduces the capital investment costs, but also improves the product quality, productivity and packaging efficiency. In addition, the POY yarns can be directly produced through the melt-spinning machine, and then various protective articles, garment accessories and products in other fields which are beneficial to the living of human can be prepared after the elasticizing and texturing process to the POY yarns;

(5) PA chips does not need to go through other complex means to improve the performance (such as viscosity) thereof, but simply composite with the reinforcing phase (especially the graphene modified by amino compound) to enable a greater increase of the performance of the prepared composite fibers, simple and efficient. Moreover, producing the nanocomposite fibers by the present invention requires no transformation or upgrade to the existing equipment for producing polyamide fiber, that is, it can be seamlessly connected therewith, which is easy to industrialize large-scale preparation and serves all mankind, improves living quality and makes great contribution to the progress of mankind.

BRIEF DESCRIPTION OF THE DRAWINGS

Other features, objects, and advantages of the present invention will become more apparent from the detailed description of non-limiting embodiments with reference to the following drawings.

DETAILED DESCRIPTION OF THE PREFERRED EMBODIMENT

The present invention is described in detail as follows with reference to specific embodiments. The following embodiments will help provide further understanding of the present invention for those skilled in the art, and not in any way limit the present invention. It shall be noted that several modifications and improvements can be made without departing from the concept of the present invention for ordinary persons skilled in the art. All these fall within the protection scope of the present invention.

Embodiment 1

This embodiment relates to a method for preparing graphene-polyamide nanocomposite fiber; the specific operational steps are as follows:

1. Preparation of Graphene-PA Masterbatch

Figure 1:
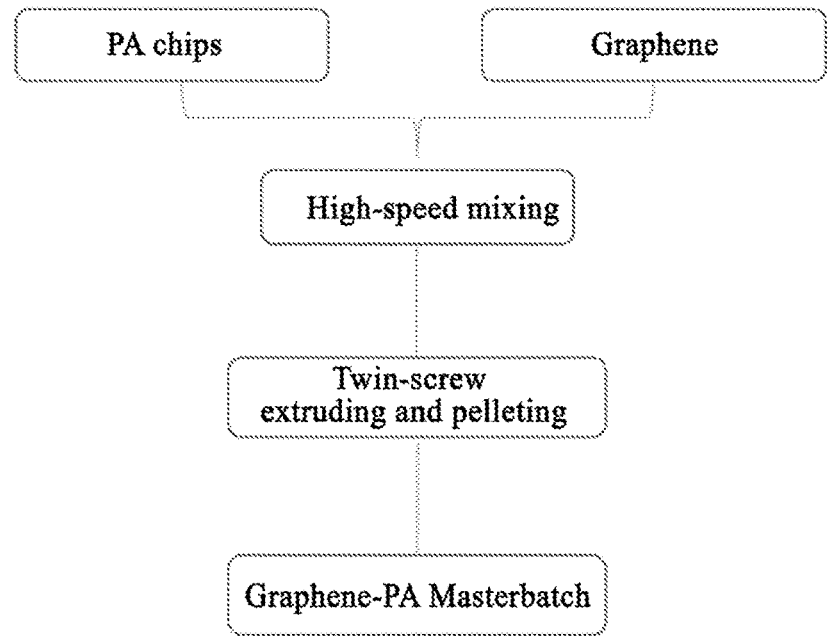
FIG. 1 is a preparation process flow diagram of graphene-PA masterbatch.

As shown in FIG. 1, polyamide (PA) (which can be PA6 or PA66, the same below; PA6 is taken as an example below) chips and modified graphene are dried and cooled to a room temperature and then mixed at a high speed; then the neat PA6 chips which are used to clean a twin-screw extruder are added to a feeder of the twin-screw extruder after a main unit and the feeder are turned on. When the twin-screw extruder begins to discharge neat PA6, the premixed chips which are the neat PA6 and graphene or modified graphene after high speed mixing are added into the feeder; graphene-PA6 nanocomposites with different types and contents are prepared through an action of the twin-screw. About 2 min later, the strip-shaped composites are fed into a pelletizer and received at an outlet of the pelletizer; and finally the graphene-PA6 masterbatch is gained.

In which, temperature parameters of Zone 1, Zone 2, Zone 3, Zone 4, Zone 5 and Zone 6 of the twin-screw extruder are respectively 220° C., 225° C., 230° C., 235° C., 230° C. and 225° C.

A rotational speed of the high-speed mixing is 15000 rad/min, and the mixing time thereof is 5 min.

A mass ratio of the modified graphene to the PA6 chips is 1%: 100% and the modified graphene is the graphene exfoliated electrochemically and modified by caprolactam.

The method for modifying the graphene by caprolactam comprises steps of: (1) sonicating the graphene exfoliated electrochemically at a certain temperature for 4 hours using nitric acid as solvent, washing the reacted acid and then drying a sonicated product; (2) adding caprolactam and the sonicated product obtained by the step (1) with an optimal proportion into N, N-dimethyl formamide (DMF) to be sonicated for one hour and then adding a certain amount of glycine, purging with nitrogen, stirring at 180° C. for 1 hour and reacting at 250° C. for a period of time; and (3) washing a reaction product obtained by the step (2) and then drying at 35° C. for 12 hours to prepare the desired modified graphene. A ratio of the caprolactam to the graphene is 5:1-1:10;

A water content of the polyamide chips is not too high. The water content of an undried chip is less than 0.1%. The moisture in the polyamide chips needs to be removed to avoid known and unknown consequences generated during spinning, thereby avoiding degradation of the performance of graphene-PA6 nanocomposite. Therefore, the polyamide chips are dried prior to the preparation of composite fibers. Generally, the water content of a dried chip is controlled to be below 60 ppm, and preferably below 30 ppm. In this embodiment, the PA6 chips are dried until the water content reaches 30 ppm.

Figure 2:
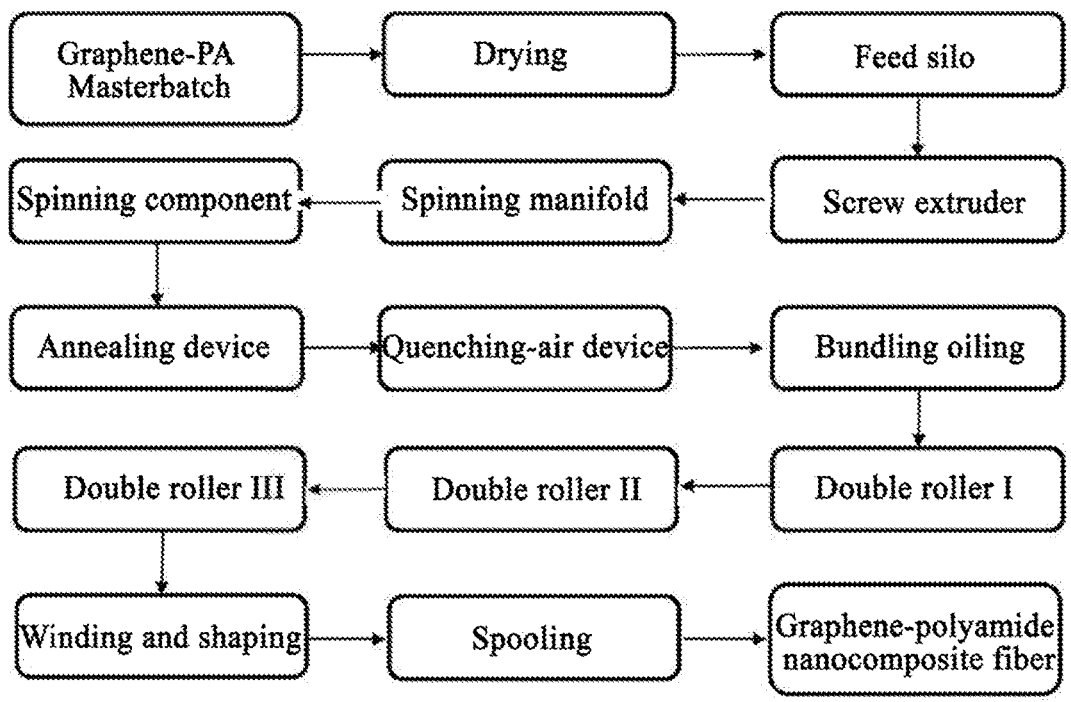
FIG. 2 is a preparation process flow diagram of graphene-polyamide nanocomposite fiber.

2. Preparation of Graphene-PA Composite Fibers by One-Step FDY Spin-Drawing and Melt Spinning As shown in FIG. 2, the graphene-PA masterbatch is dried and fed into a feed silo and enters a spinning manifold through a screw extruding device of a melt spinning machine; and then spun through a spinning component before passing through an annealing device and a quenching-air device to be cooled and shaped, and oiled for the bundling; finally, the graphene-PA6 composite fiber is prepared by stretching through the double rollers I, II and III and the winding of spooling.

In which, an annealing humidity is 80%; a quenching air speed is 1.8 m/s; an oiling parameter is 15 rad/min; a rotational speed of the double rollers I to III is in a range of 300-2100 m/min.

The graphene-PA masterbatch is dried at a temperature of 70-150° C. for a period of 30 hours. A water content of the dried graphene-PA masterbatch is 30 ppm.

Embodiment 2

The present embodiment relates to a method for preparing graphene-polyamide nanocomposite fiber; the specific operational steps are basically the same as those in Embodiment 1, except that:

1. In the Preparation of Graphene-PA Masterbatch,

A rotational speed of the high-speed mixing is 14000 rad/min, and a mixing time thereof is 5 min.

A mass ratio of the modified graphene to the PA6 chips is 1%:1, and the modified graphene is a mixture of a CVD growth graphene modified by poly diallyldimethylammonium chloride and a reduced graphene oxide obtained by thermal expansion at elevated temperature and modified by polyether amine with a mass ratio of 1:1;

The method for modifying the graphene by poly diallyldimethylammonium chloride comprises steps of: (1) sonicating the CVD growth graphene at a certain temperature for 5 hours using nitric acid as solvent, and then washing a reacted acid; (2) adding poly diallyldimethylammonium chloride into a product obtained by the step (1), wherein a ratio of the poly diallyldimethylammonium chloride to the graphene is 1:1-1:20; and (3) stirring a solution obtained by the step (2) in a water bath at 50° C. for 2 hours to prepare the desired modified graphene.

The method for modifying the graphene by polyether amine comprises steps of: (1) pretreating the reduced graphene oxide obtained by thermal expansion at elevated temperature with nitric acid, washing a reacted acid, and then dispersing in a certain amount of dimethylacetamide (DMAc) and sonicating until the reduced graphene oxide is evenly dispersed; and (2) adding the polyether amine to a three-neck flask, adding a solution in the step (1) in the three-neck flask in step (2), purging with nitrogen to be protected, and magnetically stirring at a certain temperature for a reaction of 24 hours, wherein a ratio of the polyether amine to the graphene oxide is 2:1.

The PA6 chips are dried until a water content thereof reaches 60 ppm.

2. In the Preparation of Graphene-PA Composite Fiber,

The graphene-PA masterbatch is dried at a temperature of 60-150° C. for 28 hours, and a water content of the dried graphene-PA masterbatch is below 60 ppm.

Embodiment 3

The present embodiment relates to a method for preparing graphene-polyamide nanocomposite fiber; the specific operational steps are basically the same as those in Embodiment 1, except that:

1. In the Preparation of Graphene-PA Masterbatch,

A rotational speed of the high-speed mixing is 15000 rad/min, and a mixing time thereof is 5 min.

A mass ratio of the modified graphene to the PA6 chips is 1%:1 and the modified graphene is a mixture of the graphene oxide modified by CTAB (Cetyltrimethyl Ammonium Bromide) and the graphene oxide modified by polyetherimide (PEI) with a mass ratio of 1:2.

The method for modifying the graphene by CTAB comprises steps of: (1) sonicating the graphene oxide to be evenly dispersed in a deionized water; (2) and then adding the CTAB, wherein a ratio of the CTAB to the graphene oxide is 2:1; and (3) heating a solution obtained by the step (2) with stirring in a water bath at 50° C. for two hours to prepare the desired modified graphene.

The method for modifying the graphene by polyetherimide (PEI) comprises steps of: (1) ultrasonically dispersing the graphene oxide in a deionized water; (2) sonicating the PEI to be evenly dispersed, wherein a ratio of the PEI to the graphene oxide is 2:1-1:20; (3) mixing a product obtained by the step (1) with a product obtained by the step (2), adding a certain amount of EDC and sonicating for 60 min, and then continuing to add a certain amount of EDC for catalytic reaction by stirring; and (4) obtaining the product after washed by centrifugation.

The PA6 chips are dried until the water content thereof reaches 40 ppm.

2. In the Preparation of Graphene-PA Composite Fiber,

The graphene-PA masterbatch is dried at a temperature of 70-180° C. for a period of 25 hours. A water content of the dried graphene-PA masterbatch is 40 ppm.

Embodiment 4

The present embodiment relates to a method for preparing graphene-polyamide nanocomposite fiber; the specific operational steps are basically the same as those in Embodiment 1, except that:

1. In the Preparation of Graphene-PA Masterbatch,

A rotational speed of the high-speed mixing is 12000 rad/min, and a mixing time thereof is 10 min.

A mass ratio of the modified graphene to the PA6 chips is 1%:1 and the modified graphene is the graphene oxide modified by bromododecane.

The method for modifying the graphene by bromododecane comprises steps of: (1) adding the graphene oxide and the potassium carbonate with an optimal proportion in anhydrous dimethylformamide, and then adding a certain amount of deionized water to be sonicated for 30 min; (2) then stirring at a certain temperature for a reaction of 12 hours and purging with nitrogen to be protected; and (3) adding the optimal proportional bromododecane for reaction at a certain temperature for 48 hours, and obtaining the desired modified graphene, wherein a ratio of the bromododecane to the graphene oxide is 3:1-1:20.

The PA6 chips are dried until a water content thereof reaches 20 ppm.

2. In the Preparation of Graphene-PA Composite Fiber,

The graphene-PA masterbatch is dried at a temperature of 70-150° C. for a period of 28 hours. A water content of the dried graphene-PA masterbatch is 20 ppm.

Embodiment 5

The present embodiment relates to a method for preparing graphene-polyamide nanocomposite fiber; the specific operational steps are basically the same as those in Embodiment 1, except that:

1. In the Preparation of Graphene-PA Masterbatch,

A rotational speed of the high-speed mixing is 15000 rad/min, and a mixing time thereof is 5 min.

A mass ratio of the modified graphene to the PA6 chips is 0.01:1, and the modified graphene is the graphene oxide modified by silane coupling agent.

The method for modifying the graphene by silane coupling agent comprises steps of: adding the graphene oxide into a container containing alcohol to be ultrasonically dispersed; then adding silane coupling agent, wherein a ratio of the silane coupling agent to the graphene oxide is 4:1; then catalyzing through adding a certain amount of acetic acid for reaction at a certain temperature for 12 hours, and refluxing and condensing.

The PA6 chips are dried until a water content reaches 25 ppm.

2. In the Preparation of Graphene-PA Composite Fiber,

The graphene-PA masterbatch is dried at a temperature of 70-140° C. for a period of 26 hours. A water content of the dried graphene-PA masterbatch is 25 ppm.

Embodiment 6

The present embodiment relates to a method for preparing graphene-polyamide nanocomposite fiber; the specific operational steps are basically the same as those in Embodiment 1, except that:

In the preparation of graphene-PA masterbatch, a mass ratio of the modified graphene to the PA6 chips is 0.01%:1 and the modified graphene is the graphene oxide modified by polyetherimide (PEI).

Embodiment 7

The present embodiment relates to a method for preparing graphene-polyamide nanocomposite fiber; the specific operational steps are basically the same as those in Embodiment 1, except that:

In the preparation of graphene-PA masterbatch, a mass ratio of the modified graphene to the PA6 chips is 10%:1 and the modified graphene is the reduced graphene obtained by thermal expansion at elevated temperature and modified by polyether amine.

Embodiment 8

The present comparative example relates to a method for preparing graphene-polyamide nanocomposite fiber; the specific operational steps are basically the same as those in Embodiment 1, except that: the electrochemically-exfoliated graphene instead of the modified graphene is directly selected.

The mechanical properties of the fiber products obtained in the above embodiments and comparative examples are tested according to the national standard; Polyamide 6 Stretch Yarn-FZ/T54007-2009; the results are shown in Table 1 below:

TABLE 1

|  | Breaking Strength (cN/dtex) | Breaking Elongation |
|---|---|---|
| Embodiment 1 | 6.5 | 20% |
| Embodiment 2 | 5.5 | 18% |
| Embodiment 3 | 4.99 | 18% |
| Embodiment 4 | 3.73 | 51% |
| Embodiment 5 | 4.39 | 25% |
| Embodiment 6 | 5.3 | 15% |
| Embodiment 7 | 5.1 | 15% |
| Embodiment 8 | 3.6 | 20 ± 4% |

In summary, the present invention provides a method for preparing a graphene-polyamide (PA) nanocomposite fiber. The graphene mentioned in the present invention may be a graphene prepared by the Hummers method or other kinds of graphene. The mentioned method comprises preparing graphene-PA nanocomposite masterbatch by a twin-screw extruder and melt-spinning the polyamide (one-step method of FDY spin-drawing). The method of the present invention does not require a more complicated process of increasing the properties (such as viscosity) of the polyamide chips. The strength of this composite can be enhanced only by an ingenious method of compositing the graphene with the matrix material. The method of the present invention is simple and practicable, and can be seamlessly connected with the existing industrialized production of polyamide melt-spinning. The high-performance graphene-PA nanocomposite can be prepared without transforming or upgrading the existing equipment. In addition, the amount of graphene needed for preparing nanocomposite by the method of the present invention is very small, which may achieve a large cost saving and mass production with good feasibility.

Specific embodiments of the present invention are described above. It shall be understood that the present invention is not limited to the above-mentioned specific embodiments, and those skilled in the art can make different variants and modifications within the scope of the claims, which shall not affect the substance of the present invention.

What is claimed is:

1. A method for preparing graphene-polyamide nanocomposite fiber, wherein the method comprises steps of:
   (S1) mixing polyamide chips and graphene or modified graphene, and then extruding and palletizing, and obtaining graphene-polyamide masterbatch; and
   (S2) melt-spinning after drying the graphene-polyamide masterbatch, and finally obtaining the graphene-polyimide nanocomposite fiber, wherein:
   the graphene is graphene oxide or graphene; the modified graphene is one or more members selected from a group consisting of a graphene oxide modified by coupling agent, a graphene oxide modified by cation surfactant, a graphene modified by alkyl bromide, a graphene modified by amino compound and a graphene modified by polyvinyl pyrrolidone and by polyvinyl alcohol;
   the graphene modified by alkyl bromide is one or more members selected from a group consisting of a graphene oxide modified by bromododecane, a graphene oxide modified by bromohexadecane and a graphene oxide modified by bromooctadecane.

2. The method for preparing the graphene-polyamide nanocomposite fiber according to claim 1, wherein the graphene modified by amino compound is one or more members selected from a group consisting of a graphene modified by caprolactam, a graphene oxide modified by amino-terminated polyethylene glycol, a graphene modified by poly diallyldimethylammonium chloride, a graphene modified by polyetherimide, a graphene modified by polyether amine, a graphene modified by hexadecyl trimethyl ammonium bromide, a graphene modified by N,N-dimethylacetamide, a graphene modified by N-(2-Acetamido)iminodiacetic acid, a graphene oxide modified by polyethylene imine and a graphene modified by N,N-dimethylamino-2-chloropropane hydrochloride.

3. The method for preparing the graphene-polyamide nanocomposite fiber according to claim 1, wherein a type of graphene in the modified graphene is one or more members selected from a group consisting of a reduced graphene oxide obtained by thermal expansion at elevated temperature, a reduced graphene oxide obtained by thermal expansion at low temperature, a graphene exfoliated electrochemically, a modified electrochemically-exfoliated graphene, a ball-milling mechanically exfoliated graphene, a three-roll milling mechanically exfoliated graphene, a CVD growth graphene, a graphene prepared by CO2-supercritical expansion and exfoliation, a graphene oxide exfoliated by chemical oxidation, a graphene prepared by Hummers, and a graphene prepared by Modified Hummers.

4. The method for preparing the graphene-polyamide nanocomposite fiber according to claim 1, wherein in the step (S1), a mass ratio of the polyamide chips to the graphene or the modified graphene is 1: 0.01%-15%.

5. The method for preparing the graphene-polyamide nanocomposite fiber according to claim 1, wherein in the step (S1), the polyamide chips and the graphene or the modified graphene are separately dried and then mixed; the polyamide chips are dried until a water content thereof is controlled to be below 60 ppm.

6. The method for preparing the graphene-polyamide nanocomposite fiber according to claim 1, wherein in the step (S1), the mixing is an intermittent mixing in a high-speed mixer; a rotational speed corresponding to the mixing is 5000-15000 rad/min and a mixing time is 1-30 minutes.

7. The method for preparing the graphene-polyamide nanocomposite fiber according to claim 1, wherein in the step (S2), the graphene-polyamide masterbatch is dried and then melt-spun; the graphene-polyamide masterbatch is dried at a temperature range from 50 to 220° C. and drying time from 4 to 40 hours, and a water content of the dried graphene-polyamide masterbatch is below 100 ppm.

8. The method for preparing the graphene-polyamide nanocomposite fiber according to claim 1, wherein the polyamide comprises polyamide 6 and polyamide 66.

* * * * *